United States Patent [19]

Mairs et al.

[11] Patent Number: 6,032,188
[45] Date of Patent: Feb. 29, 2000

[54] METHOD AND SYSTEM FOR CONTROLLING DATA FLOW

[75] Inventors: Christopher J. Mairs, London, United Kingdom; Philip May, Southampton, Bermuda

[73] Assignees: Microsoft Corporation, Redmond, Wash.; PictureTel Corporation, Danvers, Mass.

[21] Appl. No.: 08/815,091

[22] Filed: Mar. 12, 1997

[51] Int. Cl.[7] .................................................... G06F 13/00
[52] U.S. Cl. .......................... 709/234; 709/213; 709/235; 370/229; 370/232; 370/235
[58] Field of Search ................................. 709/226, 234, 709/235, 213, 104, 105; 370/229, 232, 234, 235

[56] References Cited

U.S. PATENT DOCUMENTS

| | | | |
|---|---|---|---|
| 4,882,687 | 11/1989 | Gordon | 364/518 |
| 5,206,934 | 4/1993 | Naef, III | 395/200 |
| 5,210,825 | 5/1993 | Kavaler | 395/147 |
| 5,255,361 | 10/1993 | Callaway et al. | 395/162 |
| 5,408,600 | 4/1995 | Garfinkel et al. | 395/153 |
| 5,457,797 | 10/1995 | Butterworth et al. | 709/226 |
| 5,546,543 | 8/1996 | Yang et al. | 709/234 |
| 5,565,886 | 10/1996 | Gibson | 345/136 |
| 5,799,150 | 8/1998 | Hamilton et al. | 709/226 |
| 5,805,821 | 9/1998 | Saxena et al. | 709/213 |
| 5,815,667 | 9/1998 | Chien et al. | 709/229 |
| 5,864,678 | 1/1999 | Riddle | 709/235 |

OTHER PUBLICATIONS

Lin et al., "Three algorithms for routing and flow control in virtual circuit networks", Global Telecommunications Conference, vol. 1, pp. 339–343, Dec. 1990.

Garcia–Haro et al., "ATM shared memory switching architectures", IEEE Network, vol. 8, Issue 4, pp. 18–26, Jul. 1994.

Sekercioglu et al., "Fuzzy control of ABR traffic flow in ATM LANs", Computers and Communications, pp. 227–232, Jun. 1995.

Dao et al., "Configurable flow control mechanisms for fault–tolerant routing", Computer Architecture, pp. 220–229, Jun. 1995.

"MVS Programming Assembler Services Reference", IBM Publication No. GC28–1910–01, Sep. 1996.

"MVS Programming Assembler Services Guide", IBM Publication No. GC28–1762–01, Sep. 1996.

*Primary Examiner*—Frank J. Asta
*Assistant Examiner*—Almari Romero
*Attorney, Agent, or Firm*—Leydig, Voit & Mayer, Ltd.

[57] ABSTRACT

A method and system for controlling flow of output data between computers sharing an application program. The application program is executed on a host computer and shared with shadow computers. Each computer has a sharing system for coordinating the sharing of the application program. The sharing system of the host computer requests a flow control system of the host computer for permission to transmit output data. The flow control system of the host computer, upon receiving the request for permission, determines whether the amount of output data currently in transit from the host computer to the shadow computers exceeds the amount that can be in transit. When the amount is not exceeded, the flow control system grants permission to the sharing system of the host computer; and when the amount is exceeded, the flow control system denies permission to the sharing system of the host computer. Periodically, the flow control system calculates a shadow display time that represents time needed to transmit a certain amount of output data to the shadow computers and to process the certain amount of output data at the shadow computers. The flow control system also adjusts the amount of data that can be in transit when the calculated shadow display time is not acceptable so that the host computer and shadow computers can be displaying output data at approximately the same time. The sharing system transmits the output data to the shadow computers when permission is granted.

11 Claims, 12 Drawing Sheets

OTHER PUBLICATIONS

"A Primer on the T.120 Series Standard," *DataBeam Corporation*, pp. 1–13, 1995.

Schroeder, Erica, "Videoconferencing–Creative brings Mac package to Windows," *PC Week*, vol. 11, No. 25, pp. 83 & 88, Jun. 27, 1994.

Intel Corporation, "Intel ProShare™ Personal Conferencing Software—Getting Started Guide," Chapter 4, pp. 25–31, 1994.

Schroeder, Erica, "PictureTel Plans Low–Cost Video App Sharing," *PC Week*, vol. 11, No. 25, pp. 1 & 171, Jun. 27, 1994.

| Time | Shadow Display Time | Current Data In Transit Limit |
|---|---|---|
| $T_0$ | — — | 64 Kilobytes |
| $T_1$ | 16 seconds | 32 Kilobytes |
| $T_2$ | 9 seconds | 16 Kilobytes |
| $T_3$ | 3 seconds | 42 Kilobytes |
| $T_4$ | 12 seconds | 21 Kilobytes |
| $T_5$ | 6 seconds | 21 Kilobytes |
| ⋮ | ⋮ | ⋮ |

METHOD AND SYSTEM FOR CONTROLLING DATA FLOW

TECHNICAL FIELD

This invention relates generally to a method and system for controlling the flow of data between computers and, more specifically, to a method and system for controlling the flow of data between computers that are sharing an application program.

BACKGROUND OF THE INVENTION

1. Application Sharing

Many application programs have been developed to execute on a personal computer. Such application programs are developed to receive their input from the user of the personal computer upon which it is executing and to display their output to the user of that personal computer. Even though the personal computers may be connected in a computer network that facilitates the transferring of information between computers, such application programs can typically interact only with the user at the computer upon which they are executing.

Some computers have been developed to allow such application programs to be "shared" by users at other computers. An application program is shared by executing the application program on one computer, by displaying the output of the application program (i.e., output data) on the display of that one computer and another computer, and by receiving input for the application program from either that one computer or the other computer. The one computer upon which the application program executes is referred to as the "host computer," the other computer is referred to as "a shadow computer," and the application program is referred to as a "shared application program." To enable such sharing, a sharing system executes simultaneously at the host and each shadow computer and coordinates the collection and transmission of data among the computers. When the shared application program generates output data, the sharing system intercepts and transmits the intercepted output data to the shadow computers. The sharing system at each shadow computer receives the output data and controls displaying of the output data. The shadow sharing system also receives input data from a user of a shadow computer and transmits the input data to the host computer. The host sharing system receives the input data and submits the input data to the shared application program, which processes the input data as if it had been received from a user at the host computer.

FIG. 1 is a diagram illustrating computers that are sharing an application program using the sharing system. One computer, Computer A 110 is connected to two other computers, Computer B 120 and Computer C 130. Computer A includes a keyboard 112, a mouse 114, and a display 116. The display 116 shows the host window 118 for the application program that is being shared. In this example, the application program entitled "MICROSOFT WORD" is being shared and is executing on the host computer, Computer A. The output data of the shared application program is being displayed in the host window 118. The host sharing system intercepts the output data of the shared application program that is directed to the host window 118. The host sharing system broadcasts the intercepted output data to each shadow computer, Computer B 120 and Computer C 130. The host sharing system also forwards the intercepted output data to the operating system of the host computer to be displayed in a normal manner within host window 118.

Computer B, a shadow computer, includes a keyboard 122, a mouse 124, and a display 126. When the shadow computer receives the intercepted output data, the shadow sharing system creates a shadow window 128 that corresponds to the host window 118 and that is registered with the operating system at Computer B. The shadow sharing system at Computer B then forwards the received output data to the operating system of Computer B for display in the shadow window 128. Similarly, Computer C, a shadow computer, receives the intercepted output data. The shadow sharing system at Computer C creates a shadow window 138 that corresponds to the host window 118 and that is registered with the operating system at Computer C. The shadow sharing system at Computer, C then forwards the received output data to the operating system of Computer C for display in the shadow window 138. Thus, all output data of the shared application program is displayed on all computers sharing that application program.

In addition, the sharing system allows a user of any computer sharing an application program to input data to the shared application program. For example, the user can input data using keyboard 122 of Computer B. The shadow sharing system at Computer B intercepts the input data and forwards the input data to the host sharing system at Computer A. The host sharing system forwards the input data to the operating system of the host computer, which forwards the input data to the shared application program for processing as if the input data had been entered on keyboard 112. When the shared application program then outputs data to host window 128 in response to receiving the input data, the host sharing system at Computer A intercepts the output data and broadcasts the intercepted output data to the shadow sharing system at Computer B, which updates shadow window 128, and to the shadow sharing system at Computer C, which updates shadow window 138.

Similarly, when a user of the host computer inputs data through keyboard 112 or mouse 114, the host sharing system at Computer A forwards the input data to the operating system of the host computer, which forwards the input data to the shared application program for processing as normal. Thus, to a user of the shadow computer, the shared application program looks as though it is executing on the shadow computer.

In one example of application sharing, an editor who is working with an editorial staff to publish a newspaper can benefit from sharing an application program that generates a word processing document. In particular, the contents of the newspaper can be stored as a word processing document, and the editor can edit the format of each page of the word processing document at the editor's computer and allow the members of the editorial staff to view the word processing document at their computers. The editor can share the word processing program with each staff member. The members of the editorial staff can view the changes made by the editor and provide input to the word processing program to modify the document based on the editor's revisions. Immediately, the editor can review these modifications to the document.

2. Routing Problem

If computers are connected serially, as they are in the system illustrated in FIG. 1, the data is transmitted from one computer to the next, sequentially. For example, Computer A is connected to Computer B, which is connected to Computer C. For a host sharing system at Computer A to transmit output data from a shared application program to shadow computers Computer B and Computer C for display, the host sharing system at Computer A transmits the output data first to the shadow sharing system at Computer B. The shadow sharing system at Computer B stores the data in a queue and forwards the data to the shadow sharing system at Computer C. Simultaneously, the shadow sharing system at Computer B processes the output data and displays it. The shadow sharing system at Computer C receives output data from the shadow sharing system at Computer B, stores it in a queue, and processes and displays the queued output data.

When computers are connected in this manner or connected through any network, the shadow computers will invariable receive the output data at different times. Because users share application programs in order to view the same output data at the same time, as in the example of the editor above, it is important that all of the sharing systems display the same output data at approximately the same time.

The following example illustrates this problem. In the example, the host sharing system at Computer A transmits output data to the shadow sharing system at Computer B at 28.8 baud, and the shadow sharing system at Computer B transmits output data to the shadow sharing system at Computer C at only 14.4 baud. The host sharing system at Computer A transmits as much output data to the shadow sharing system at Computer B as the shadow sharing system at Computer B can receive at 28.8 baud. Then, the shadow sharing system at Computer B stores the output data in its queue, and transmits as much output data to the shadow sharing system at Computer C as the shadow sharing system at Computer C can receive at 14.4 baud. As the shadow sharing system at Computer B transmits output data to the shadow sharing system at Computer C at only 14.4 baud, the shadow sharing system at Computer B continues to receive output data from the host sharing system at Computer A and stores additional output data that is to be transmitted to the shadow sharing system at Computer C. Because the shadow sharing system at Computer C receives the output data that the sharing systems at Computer A and Computer B at a time later than those sharing systems, the shadow sharing system at Computer C falls increasingly behind processing and displaying the output data relative to the output data that the sharing systems at Computer A and Computer B are displaying. Therefore, the user at Computer C does not view the same data at the same time as the users at Computer A and Computer B.

Some systems could solve the routing problem discussed above by allowing only a predetermined amount of output data to be in transit for an application program. In particular, these systems could allow a host sharing system to transmit a predetermined amount of output data. Then, the host sharing system computer waits for an indication of receipt of output data from the last shadow sharing system that is to receive the output data. The host sharing system can transmit additional output data only after receiving the indication. Because additional output data is not transmitted until the last shadow sharing system receives the output data, each sharing system will have received and displayed the same output data. For example, the host sharing system at Computer A displays output data and transmits output data to the shadow sharing system at Computer B. The shadow sharing system at Computer B receives the output data, transmits an indication that it has received the output data to the host sharing system at Computer A, and transmits the output data to the shadow sharing system at Computer C. Simultaneously, the shadow sharing system at Computer B processes and displays the output data. When the shadow sharing system at Computer C receives the output data, the shadow sharing system at Computer C transmits an indication that it has received the output data to the host sharing system at Computer A. Simultaneously, the shadow sharing system at Computer C processes and displays the output data. Therefore, the sharing systems at Computers A, B, and C display the same output data at approximately the same time. Only after receiving the indication from both the shadow sharing system at Computers B and C can the host sharing system at Computer A transmit additional output data.

SUMMARY OF THE INVENTION

The present invention provides a method and system for controlling flow of output data between computers sharing an application program. The application program to be shared is executed on a host computer and is shared with shadow computers. The host computer intercepts and transmits output data of the shared application program to each shadow computer. The host computer then calculates a shadow display time representing the time it takes for each shadow computer to receive and display the output data. When the shadow display time is greater than acceptable, the host computer decreases the amount of data that can be in transit at one time from the host computer to the shadow computers. When the shadow display time is less than a time that is still acceptable, the host computer increases the amount of data that can be in transit from the host computer to the shadow computers. If the amount of data in transit would exceed the amount of data that can be in transit, then the host computer delays the transmission of any additional output data. In this way, the host computer can dynamically adjust the amount of data that can be in transit so that each shadow computer can display the data within an acceptable time.

In another aspect of the present invention, each computer has a sharing system for coordinating the sharing of the application program. The sharing system of the host computer has a flow control system that calculates the shadow display time and adjusts the amount of data that can be in transit. When a host sharing system at the host computer is ready to transmit output data, the host sharing system requests permission from a host flow control system at the host computer. The host flow control system denies permission whenever the amount of data that can be in transit is exceeded. If the host sharing system is denied permission, then the host flow control system notifies the host sharing system when the output data can be eventually transmitted.

In yet another aspect of the present invention, each computer has a sharing system for coordinating the sharing of the application program and each sharing system has a flow control system. A shadow sharing system of a shadow computer notifies a shadow control system of the shadow computer when output data has been displayed. The shadow flow control system notifies a host flow control system of the host computer that is used by the host flow control system. The host flow control system uses that notification to calculate the shadow display time.

DETAILED DESCRIPTION OF THE INVENTION

Figure 1:
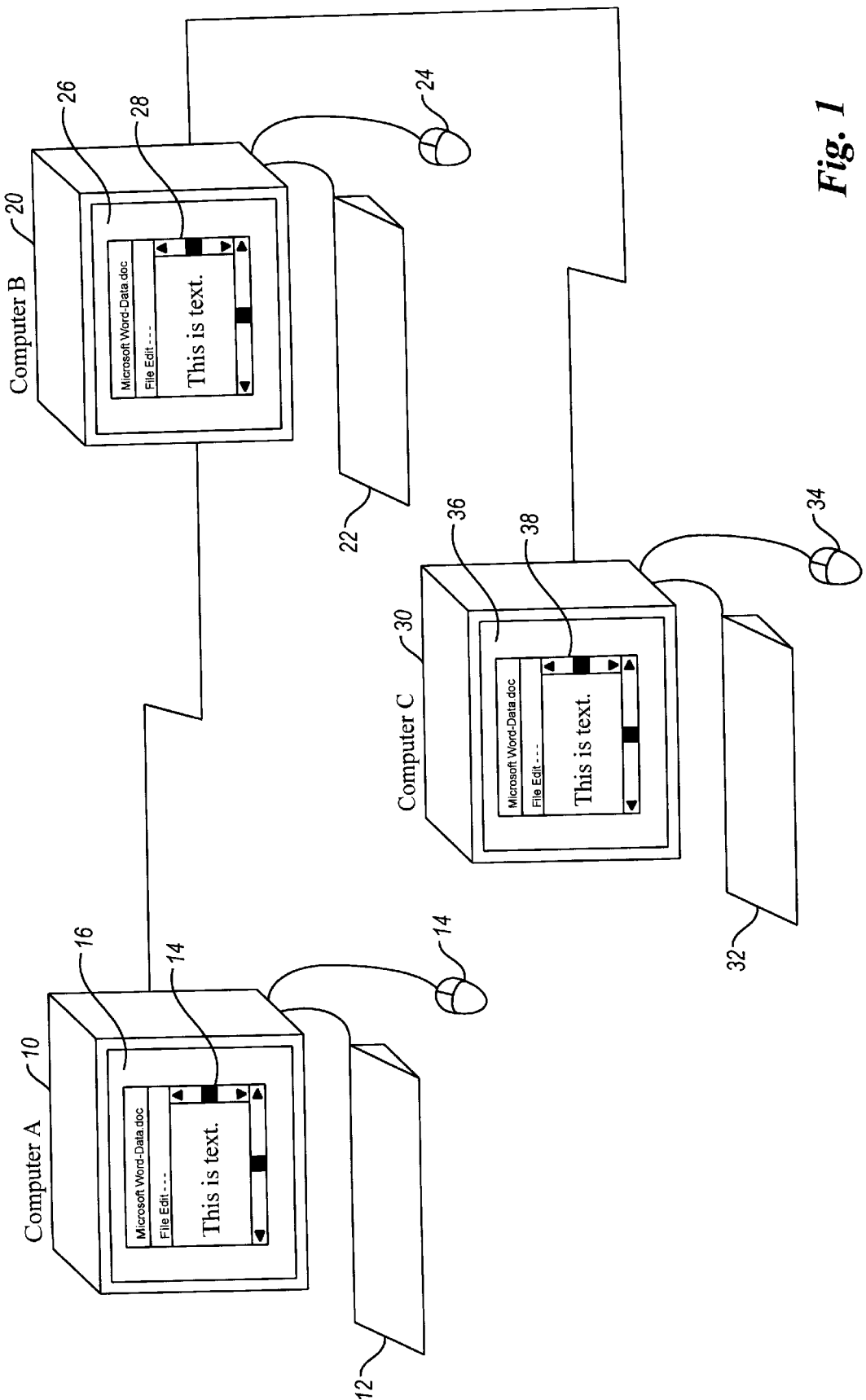
FIG. 1 is a diagram illustrating computers that are sharing an application program.

The present invention provides a method and system for controlling the flow of output data transmitted to computers that are sharing an application program. The flow control system of the present invention controls transmitting to ensure that each shadow computer displays the output data at approximately the same time as the host computer. The flow control system controls the transmitting by dynamically adjusting the amount of output data of a shared application program that can be in transit from the host computer to the shadow computers. The amount of output data in transit generally represents data that has been transmitted by a host computer but not yet acknowledged as having been received and processed by each shadow computer. The flow control system adjusts the amount of output data that can be in transit based on the time that it takes for the data to be transmitted and processed by all the shadow computers. If the time is longer than acceptable, then the flow control system reduces the amount of data that can be in transit. Conversely, if the time is shorter than what would also be acceptable, then the flow control system increases the amount of data that can be in transit. In this way, the flow control system ensures that a maximum amount of output data can be in transit, while ensuring that the time of data transmission is acceptable.

The flow control system adjusts the amount of data that can be in transit to ensure that the "shadow display time" is acceptable. The shadow display time represents the time from when the host computer transmits output data until the host computer receives an acknowledgment from each shadow computer that all the output data has been processed. For example, in one embodiment, the minimum acceptable time is 4 seconds and the maximum acceptable time is 8 seconds. When the shadow display time falls outside this acceptable range, the flow control system adjusts the amount of data that can be in transit. In particular, when the shadow display time is smaller than the minimum acceptable time (i.e., data is being processed quickly by the shadow computers). The flow control system recognizes that even if more data were in transit, it could still be displayed at all shadow computers within the acceptable time period. Therefore, the flow control system increases the amount of data in transit, up to a predetermined maximum. The increase is preferably determined by dividing the amount of data that has been in transit by its shadow display time and multiplying this result by the maximum acceptable time. For example, if 100 kilobytes of data is in transit and the shadow display time for that data is two seconds and the maximum acceptable time is eight seconds, then the flow control system increases the amount of data that can be in transit to 400 kilobytes (100/2*8). When the shadow display time is larger than the maximum acceptable time, the flow control system recognizes that the output data is not being displayed at at least one of the shadow computers within the acceptable time period. Therefore, the flow control system preferably halves the amount of output data that can be in transit, down to a predetermined minimum. When the amount of data that can be in transit is decreased in this manner, the shadow computers are sent less output data so that it can be displayed while the host computer is still displaying the same output data.

Figure 2:
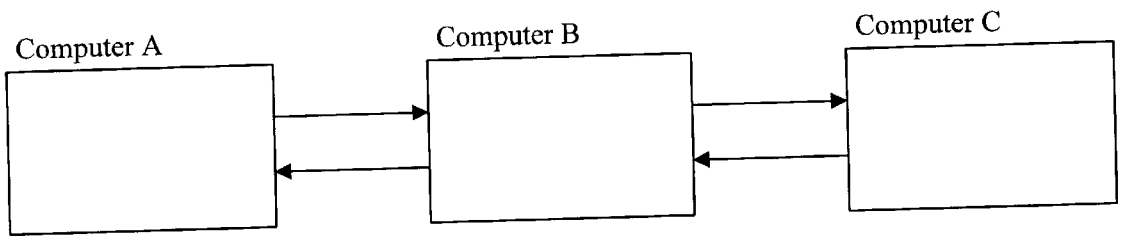
FIG. 2 illustrates how the flow control system adjusts the amount of data in transit based on the shadow display time.

FIG. 2 illustrates how the flow control system adjusts the amount of data that can be in transit based on the shadow display time. Computer A, Computer B, and Computer C are connected serially in this example. When data is transmitted from Computer A to Computer C, it is first transmitted from Computer A to Computer B, which in turn transmits the data to Computer C. Initially, at time T0, the amount of data that can be currently in transit is 64 kilobytes, but no data has yet been transmitted. The flow control system then allows 64 kilobytes of data to be transmitted. At time T1, the flow control system determines that the shadow display time for the 64 kilobytes of data is 16 seconds. Because 16 seconds is larger than the maximum acceptable time of 8 seconds, the flow control system determines that not all the shadow computers are displaying the data within the acceptable time range. Therefore, the flow control system halves the amount of data that can be in transit to 32 kilobytes and allows 32 kilobytes of data to be transmitted. At time T2, the flow control system determines that the shadow display time for the 32 kilobytes is 9 seconds. Since 9 seconds is still larger than 8 seconds, the flow control system again halves the amount of data that can be in transit to 16 kilobytes and allows 16 kilobytes of data to be transmitted. At time T3, the flow control system determines that the shadow display time for the 16 kilobytes is 3 seconds. Because 3 seconds is smaller than the minimum acceptable time of 4 seconds, the flow control system increases the amount of data that can be in transit to 42 kilobytes (=16/3*8) and allows 42 kilobytes of data to be transmitted. At time T4, the flow control system determines that the shadow display time for the 42 kilobytes of data is 12 seconds. Because 12 seconds is larger than 8 seconds, the flow control system halves the amount of data that can be in transit to 21 kilobytes and allows 21 kilobytes of data to be transmitted. At time T5, the flow control system determines that the shadow display time for the 21 kilobytes is 6 seconds. Because this shadow display time is within the acceptable time range, the amount of data that can be in transit is not adjusted at this time. The ellipses illustrate that the flow control system continues to adjust the amount of data that can be in transit based on the data transmission time. In a more arbitrarily configured computer network, such as the Internet, the shadow display time for a given amount of data can vary based on the particular routing path used to transmit the data. This dynamic adjustment of the amount of data that can be in transit helps ensure that the data will be processed within an acceptable time regardless of the routing path.

In one embodiment, a copy of a sharing system that includes the flow control system resides at each computer that is sharing the application program. (One skilled in the art would recognize, however, that the flow control system could be separate from the sharing system.) In this embodiment, each sharing system uses the flow control system to coordinate the transmission of the output data. When the host sharing system wishes to transmit output data for the shared application program, it requests permission to transmit from the flow control system at the host computer ("host flow control system"). If the amount of data currently in transit does not exceed the amount of data that can be in transit, then the host flow control system grants permission to the host sharing system. When the host sharing system receives permission from the host flow control system, the host sharing system transmits the output data to the shadow computers. If, however, the amount of data currently in transit is equal to or exceeds the amount of data that can be in transit, then the host flow control system denies permission. At a later time, when all the data that was in transit has been processed by the shadow computers, the host flow control system notifies the host sharing system. The host sharing system then again requests permission from the host control system which is then granted.

The host flow control system determines the shadow display time by sending data notification messages to the shadow computers and receiving notification acknowledgment messages from the shadow computers. In particular, prior to granting permission to the host sharing system to transmit data, the host flow control system transmits a data notification message to the flow control systems at the shadow computers. The shadow flow control systems then transmit a notification acknowledgment message to the host flow control system when they complete processing of the output data. When a shadow sharing system completes processing of the output data, it notifies the shadow flow control system, which transmits the acknowledgment. The shadow display time, in one embodiment, is the time from when the data notification message is sent until acknowledgment has been received from each shadow computer. Alternatively, the shadow display time can be calculated in many to different ways. For example, each shadow flow control system can transmit its acknowledgment before completing processing of all the output data. In this way, additional output data can be already in transit as the shadow computer completes its processing. This overlapping of transmitting and processing helps to minimize the idle time at the shadow computers.

Figure 3:
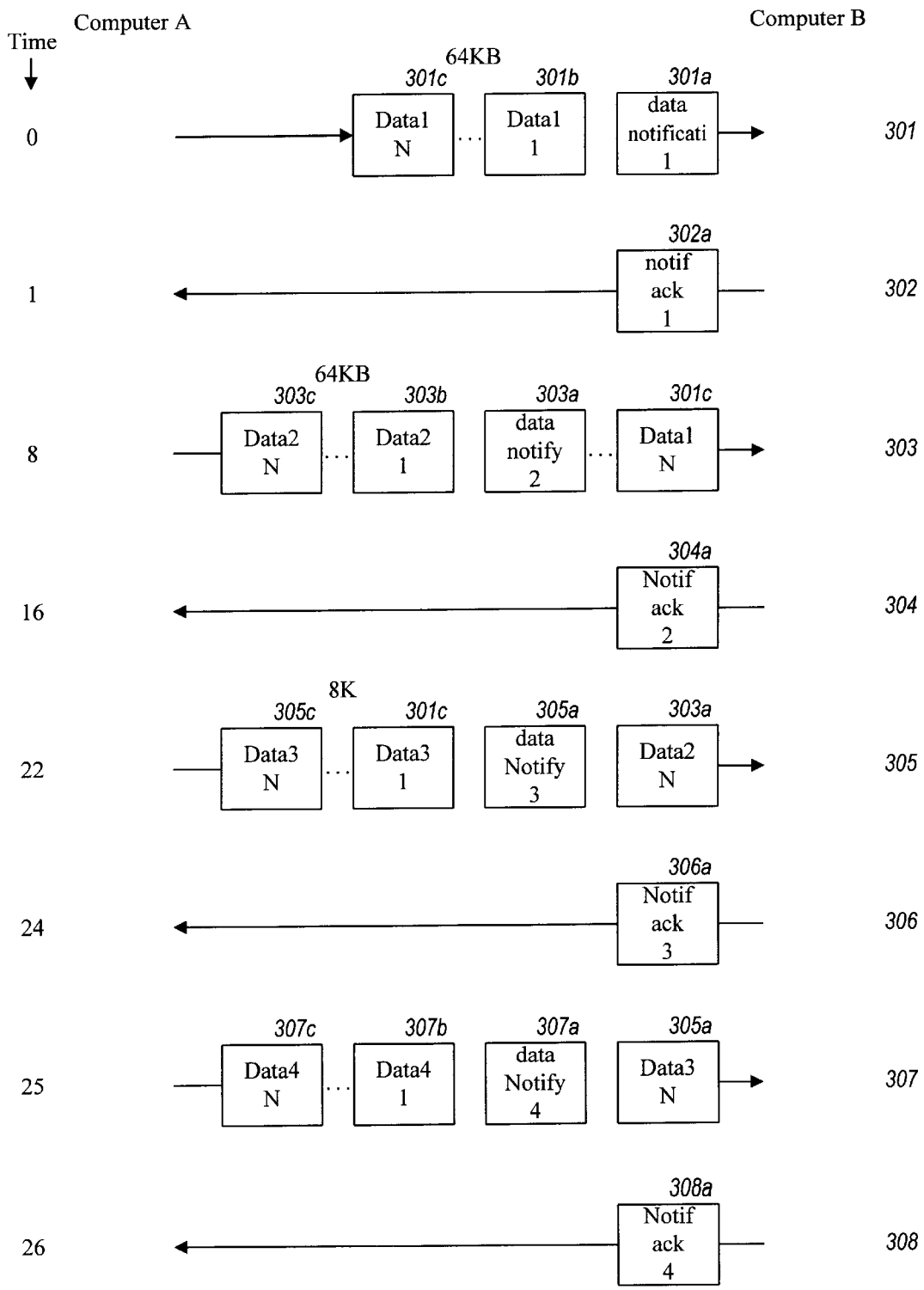
FIG. 3 illustrates the use of messages to determine the shadow display time in an alternate embodiment.

FIG. 3 illustrates the use of data notification messages and notification acknowledgment messages to determine the shadow display time. The shadow display time represents generally the time from the start of transmission of data messages until the time that each shadow computer has processed the data messages. The host flow control system transmits a data notification message before transmitting data messages. The shadow display time for those data messages is the time from transmitting the data notification message until the host flow control system receives the notification acknowledgment message for the next data notification message transmitted after those data messages. In the example of FIG. 3, data is to be transmitted from the host computer A to the shadow computer B. The initial current data in transit limit is 64 kilobytes. When the host sharing system has data to transmit, it requests permission from the host flow control system. Since no data is currently in transit, the host flow control system transmits the first data notification message 301 and grants permission to the host sharing system. The host sharing system then transmits the data message 301b. When the host sharing system has more data to transfer, it again requests permission from the host flow control system. If the host flow control system determines that the amount of data currently in transit is less than the current in transit limit, then the host flow control system grants permission and the host sharing system transmits its next data message 301c. If the host flow control system determines that the amount of data currently in transit is greater or equal to the current in transit limit, then the host flow control system denies permission (i.e., a backlog). When the shadow flow control system receives the first data notification message, the shadow sharing system does not currently have any data messages that have not yet been processed and it transmits the first notification acknowledgment message 302a to the host computer. When the host flow control system receives the first notification acknowledgment message, there is no previous data notification message from which to determine a shadow display time, so it disregards it as an indication of the shadow display time.

When the host flow control system receives the first notification acknowledgment message, it notifies the host sharing system that it can transmit more data (because of the backlog). The host sharing system then requests permission to transmit the data message 303b. Upon receiving the request, the host flow control system transmits the second data notification message 303a and grants permission to the host sharing system. The host sharing system then transmits the data message 303b and requests permission to transmit other data messages 303c until it is denied permission. When the shadow sharing system completes processing the data message 301c, which was the last data message transmitted before the second data notification message was transmitted, it indicates the completion to the shadow flow control system, which may have already received the second data notification message. When the shadow flow control system has received both the indication and the second data notification message, it transmits the second notification acknowledgment message 304a. When the host flow control system receives this second notification acknowledgment message, it determines the time between sending the first data notification message and receiving the second notification acknowledgment (i.e., 16 seconds). Since the host flow control system had denied permission to the host sharing system to transmit additional data before transmitting second data notification message, then the amount of data that was transmitted before transmitting the second data notification messages was at least the current in transit limit of 64 kilobytes. Thus, the determined time represents time to process an amount of data indicated by the current in transit limit and is considered a shadow display time. The host flow control system then adjusts the current in transit limit accordingly (i.e., reduces it to 32 kilobytes).

When the host flow control system receives the second notification acknowledgment message, it also notifies the host sharing system so that it can transmit more data. In this case, the host sharing system transmits only 8 kilobytes of data, data messages 305b and 305c, in-between the host flow control system transmitting the third data notification message 305a and receiving the third notification acknowledgment message 306a.

When the host flow control system receives the third notification acknowledgment message 306a, it determines the time between transmitting the second data notification message and receiving the third notification acknowledgment (i.e., 16 seconds). Since the host flow control system had denied permission to the host sharing system to send additional data before transmitting the third data notification message 305a, the host flow control system considers this time to be a display shadow time and adjusts the current in transit limit accordingly (i.e., reduces it to 16 kilobytes).

Before granting permission to the host sharing system to transmit more data, the host flow control system transmits the fourth data notification message 307a. When the host flow control system receives the fourth notification acknowledgment message 308a, it determines the time between transmitting the third data notification message and receiving the fourth notification acknowledgment (i.e., 4 seconds). However, since this determined time does not represent time needed to process the current in transit limit amount data at the time it was transmitted, the host flow control system does not consider it to represent a shadow display time and disregards it. However, if the determined time was greater than the maximum acceptable time, then the host flow control system would consider the determined time to be a shadow display time regardless of whether the current in transit limit amount of data was transmitted just before the fourth data notification message. That is, any time that the maximum acceptable time is exceeded, the current in transit limit is reduced regardless of how much data was actually in transit.

The data notification and notification acknowledgment messages contain several fields. Both messages include a type field indicating whether the message is a data notification or notification acknowledgment message, a sequence field indicating the sequence number of the message, and a node identification field identifying the computer from which the message was transmitted. The sequence number is a unique, sequentially increasing number. The first data notification message transmitted for the shared application program by the sharing system has a sequence number of one. For each succeeding data notification message, the host sharing system increments the sequence number by one. Moreover, a notification acknowledgment message contains a field for the sequence number of the data notification message to which it is responding.

Because data notification messages increase the overhead of processing data messages, a host flow control system preferably does not transmit a data notification message prior to each data message. Instead, the host flow control system transmits a data notification message based on a predetermined delay period. In effect, the flow control system calculates the shadow display time only periodically, rather than for every block of data transmitted.

The shadow flow control systems transmit notification acknowledgment messages in two instances. First, when the shadow computer is ready to receive additional data messages, the shadow flow control system responds to the last received data notification message with a notification acknowledgment message whose sequence number matches the sequence number of the data notification message. This matching sequence number indicates to the host flow control that that shadow computer is ready to receive more data. Second, when the shadow computer is slow at processing data, the shadow flow control system transmits a notification acknowledgment message with a sequence number that matches the sequence number of a previously acknowledged data notification message. The host flow control system assumes that if a shadow computer does not send an acknowledgment message within a certain time period, then the shadow computer is no longer sharing the application program. If, however, the shadow flow control system continues to send acknowledgment messages for previous notification messages, then the host flow control system assumes that the shadow computer is simply slow in receiving or processing the current data.

Moreover, the host flow control system maintains a list of the shadow computers that are currently sharing the application program. This list is used to keep track of which shadow computers have acknowledged a data notification message. When every shadow flow control system has responded with a notification acknowledgment message, the host flow control system determines that the shared application program has no data in transit and can transmit additional data. Whenever a notification acknowledgment message is received from a computer that is not on the list, the computer is added to the list as a new shadow computer. Conversely, whenever a shadow computer does not respond for a predetermined period, then it is removed from the list. In this way, the flow control system can track the presence of the shadow computer without additional interfacing with the sharing system.

Figure 4:
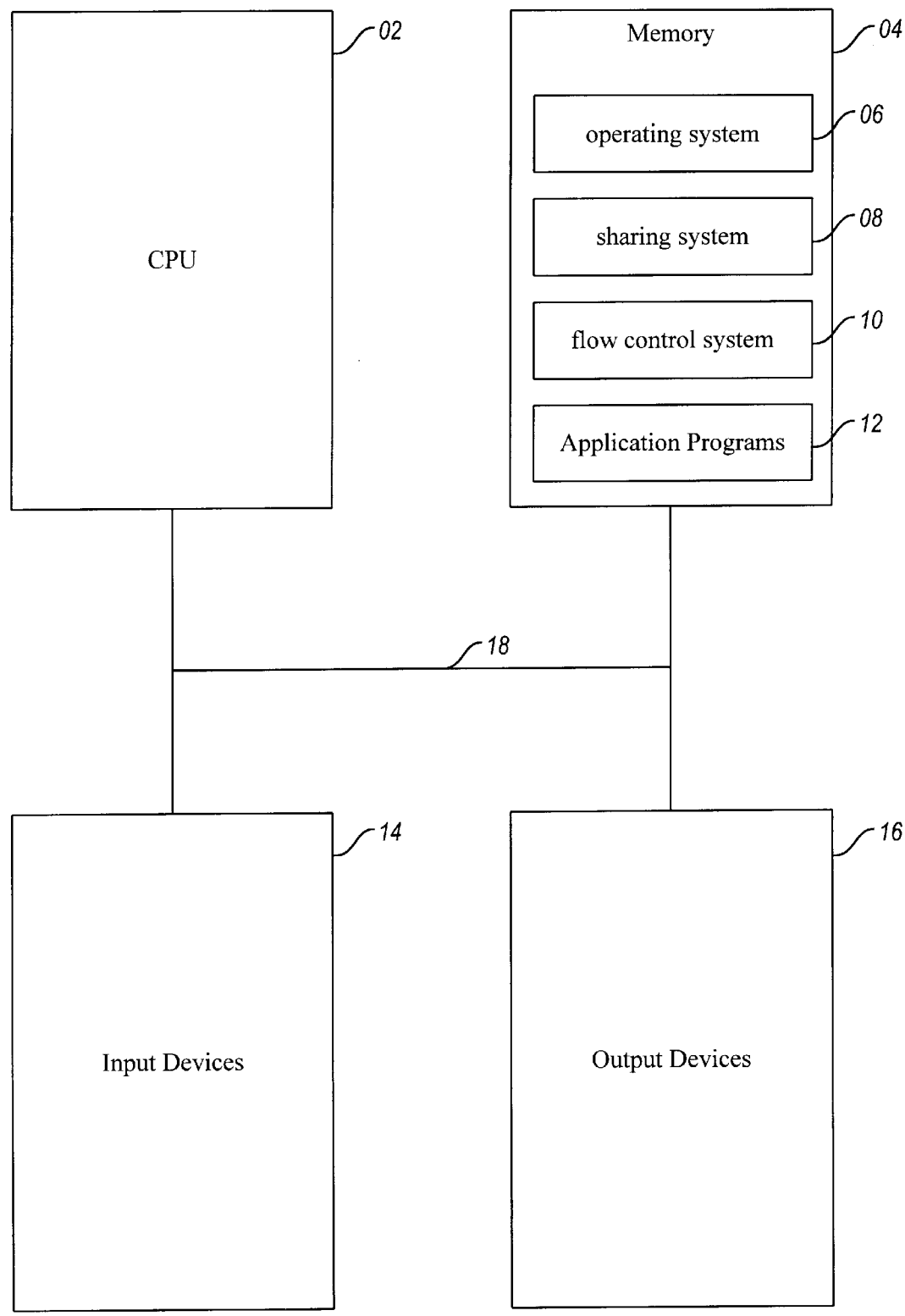
FIG. 4 illustrates a block diagram of a computer on which the flow control system executes.

FIG. 4 illustrates a block diagram of a computer on which the flow control system executes. The computer includes a central processing unit (CPU) 402, a memory 404, input devices 414, and output devices 416. The input devices preferably include a keyboard and a mouse. The output devices preferably include a display device, such as a CRT. The CPU, memory, input devices, and output devices are interconnected by a bus 418. The memory contains an operating system 406, such as the Microsoft Windows operating system. The memory also contains a sharing system 408 that includes a flow control system 410. Additionally, the memory contains application programs 412. The sharing system can be stored on a computer-readable medium, such as a disk.

Figure 5:
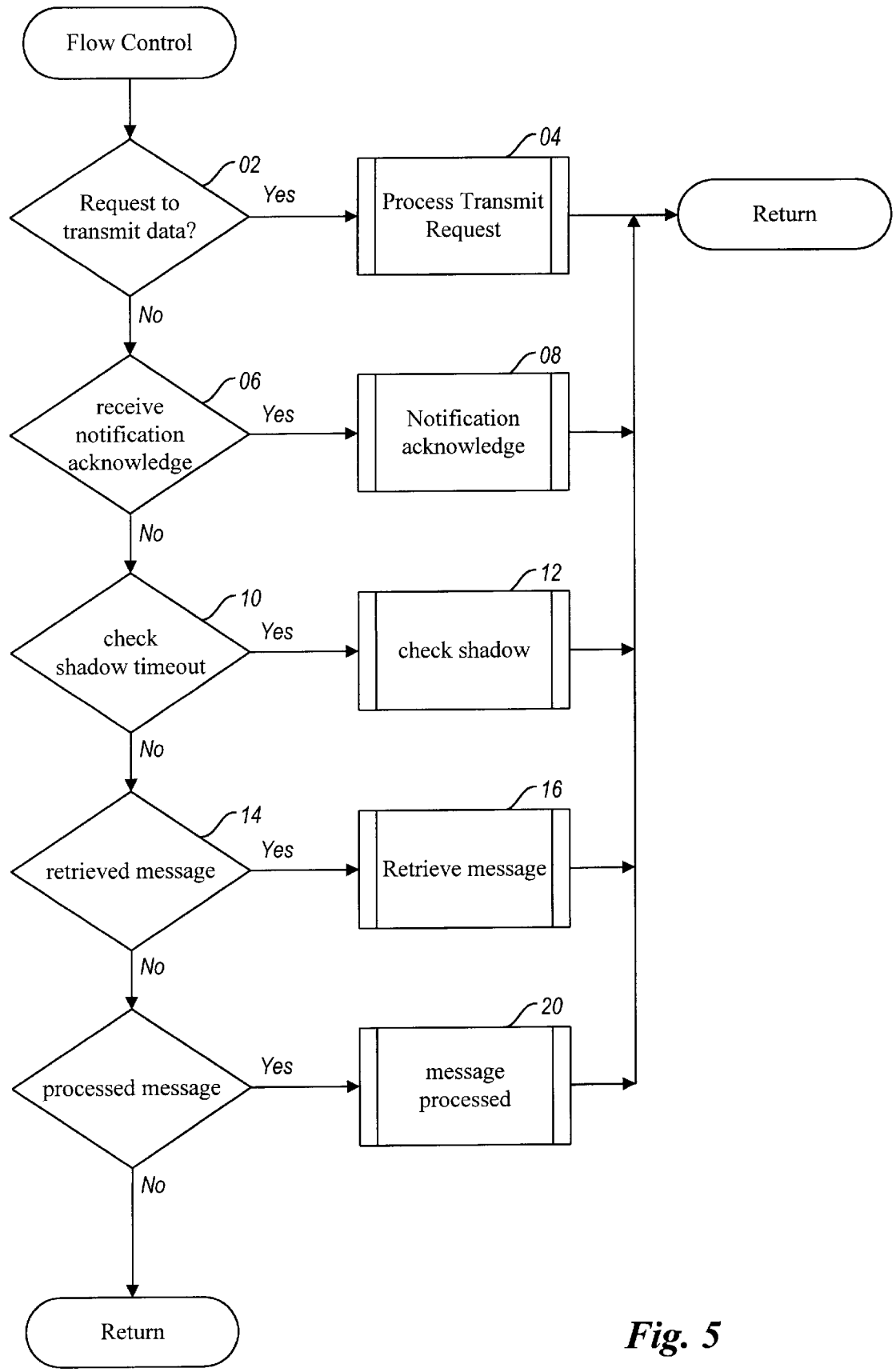
FIG. 5 is a flow diagram of a flow control system.

FIG. 5 is a flow diagram of a flow control system. The flow control system interacts with the sharing system to control the transmission of output data. Whenever the host sharing system is ready to transmit output data, it first requests permission from the flow control system. If the amount of data currently in transit is less than the current amount that can be in transit, then the flow control system grants permission to the host sharing system. If, however, the amount of data in transit is greater than or equal to the current amount that can be in transit, then the flow control system denies permission. Whenever a notification acknowledgment message is received, the host flow control system determines whether all the shadow computers have acknowledged the last data notification message that was sent. If all have acknowledged and the flow control system has denied permission to the sharing system, the flow control system now notifies the sharing system that it can transmit the data that was previously denied permission. Also, the host flow control system periodically checks to see whether any shadow computers are not responding. If no shadow computer has responded for a predetermined interval, then each shadow computer that has not responded to the last data notification message is removed from the list of shadow computers. Also, the flow control system assumes that all the shadow computers have acknowledged the last data notification message and indicates that no data is currently in transit and allows the host sharing system to transmit more data.

A shadow sharing system is responsible for indicating to its shadow flow control system whenever it receives a data message and whenever it completes processing a data message. The shadow flow control system tracks how many data messages that the shadow sharing system has yet to process by incrementing and decrementing a counter. When the shadow flow control system receives an indication that the shadow sharing system has received a data message, it determines whether a pre-defined interval has expired since it last transmitted a notification acknowledgment message. If the interval has expired, then it re-transmits the last notification acknowledgment message. This re-transmitting informs the host flow control system that this shadow computer is still sharing the application program and should not be removed from the list of shadow computers. If the shadow flow control system decrements the counter to zero (or some other small pre-defined number), the shadow flow control system transmits a notification acknowledgment message for the data notification message that has not yet been acknowledged.

Referring to FIG. 5, in step 502, if a request to transmit data is received from the host sharing system, the flow control system continues at step 504, otherwise the flow control routine continues at step 506. in step 504, the flow control system invokes the process transmit request routine which either grants or denies permission to transmit the data. In step 506, if a notification acknowledgment message is received from a shadow computer, then the flow control system continues at step 508, otherwise the flow control system continues at step 510. In step 508, the flow control system invokes the notification acknowledgment routine to keep track of which shadow computers have acknowledged the last data notification message. In step 510, if the time since last checking whether shadow computers have responded exceeds a predetermined interval, the flow control system continues at step 512, otherwise the flow control system continues at step 514. In step 512, the flow control system invokes the check shadow routine to remove from the list of shadow computers all shadow computers that have not yet responded to the last data notification message. In step 514, if a notification that a data message being retrieved is received, the flow control system continues at step 516, otherwise the flow control routine continues at step 518. In step 516, the flow control system invokes the retrieve message routine to indicate to the host flow control system that the shadow sharing system is still processing data messages. In step 518, if a notification that a data message has been processed is received, the flow control system continues at step 520, otherwise the flow control system returns. In step 518, the flow control system invokes the message processed routine so that the shadow flow control system can acknowledge that the data message has been processed.

Figure 6:
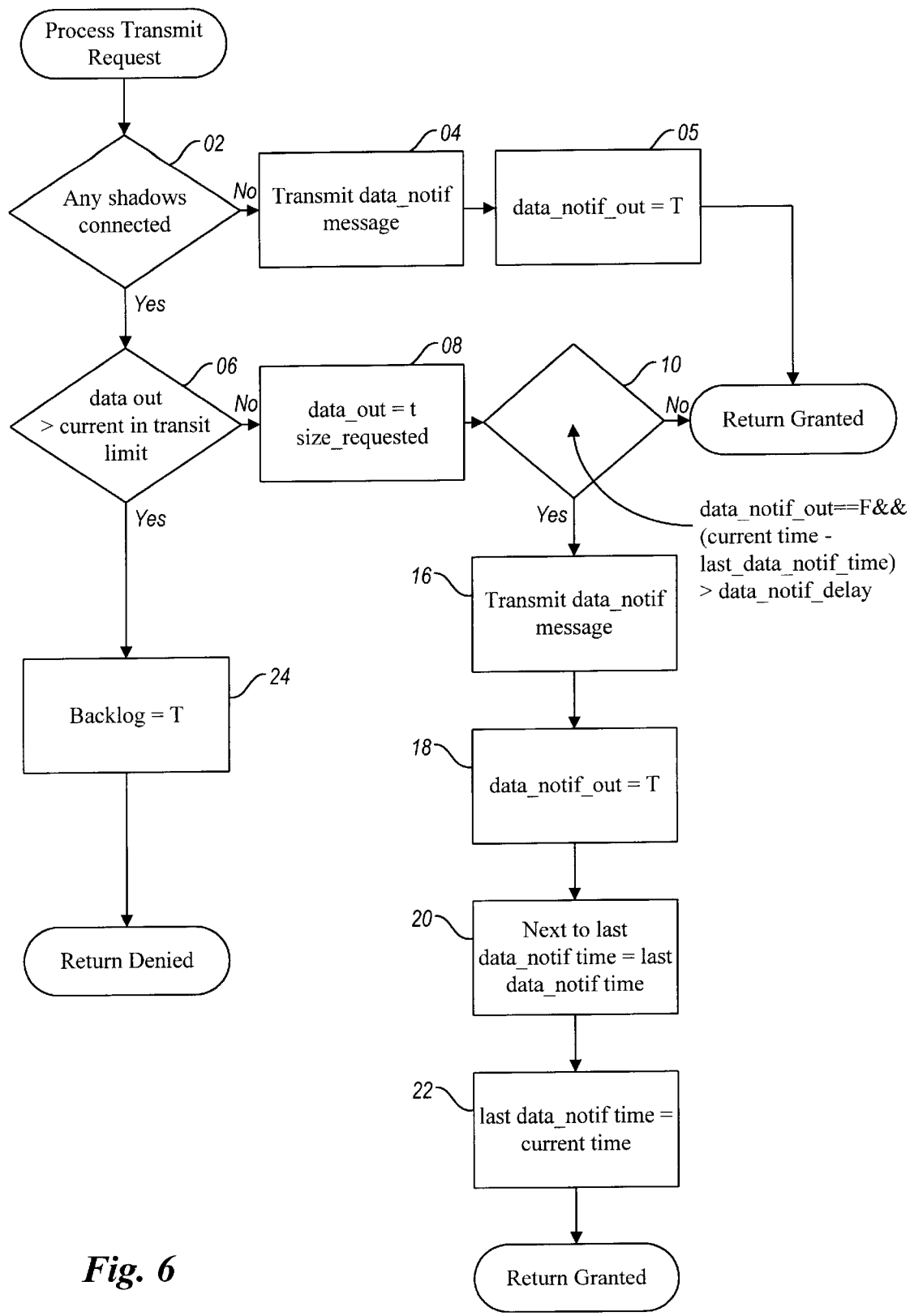
FIG. 6 is a flow diagram of the process transmit request routine.

FIG. 6 is a flow diagram of the process transmit request routine. This routine is passed the size of the data that is being requested to be transmitted and returns either a denial or a grant of permission. The host flow control system controls the flow of data by dynamically adjusting the amount of output data that can be in transit. Upon receiving a request for permission to transmit data, the host flow control system determines whether the amount of data currently in transit exceeds the amount of data the shared application program can have in transit. When the amount is exceeded, then the host flow control system sets a flag to indicate that there is a backlog. A backlog means that the host sharing system has data that is ready to be transmitted but which cannot yet be transmitted. If there is a backlog and the host flow control system determines that there is no longer any data currently in transit (i.e., all shadow computers have acknowledged the last data notification message), the flow control system notifies the host sharing system that it can now transmit the backlogged data. The host flow control system also determines whether to transmit a data notification message. Data notification messages are transmitted when the last data notification message has already been acknowledged and the time since the last data notification message was transmitted is greater than the data notification delay. As discussed above, the host flow control system does not transmit data notification messages when one has been transmitted to which each shadow flow control system has not yet responded.

Referring to FIG. 6, in step 602, the routine determines whether any shadow computers are sharing the shared application program. If no shadow computer systems are currently sharing, then the routine continues at step 604, otherwise the routine continues at step 606. In steps 604 and 605, the routine sends a data notification message to see by its acknowledgment whether any shadow computers have started sharing the application program. In step 604 the routine transmits a data notification message. In step 605, the routine indicates that there is currently a data notification message outstanding (i.e., a message that all shadow computers have not yet acknowledged) and returns. in step 606, if the amount of data currently in transit is greater than the current amount that can be in transit, then the routine continues at step 624, otherwise the routine continues at step 608. When a sharing system requests to transmit data, the request is granted whenever the amount of data currently in transit is less than the current amount that can be in transit. For example, if the current amount that can be in transit is 100K and the amount of data currently in transit is 90K, then any request is granted. After the request is granted, however, the amount of data currently in transit is incremented by the requested amount. For example, if the requested amount is 50K, then the amount currently in transit is increased to 140K. Afterwards, any request to transmit more data will be denied until the data currently in transit has been acknowledged. In steps 608–22 the routine increments the amount of data currently in transit and transmits a data notification message if appropriate. In step 608, the routine increments the amount of data in transit by the amount of data the sharing system wishes to transmit. In step 610, if no data notification messages are currently outstanding and the time since the last data notification message was transmitted is greater than a data notification delay time period, then the routine continues at step 616, otherwise the routine returns. This delay time period is the minimum time between transmitting data notification messages. In step 616, the routine transmits a data notification message. In step 618, the routine indicates that a data notification message is outstanding. In step 620, the routine records the time at which the previous data notification message was transmitted. In step 622, the routine sets the time at which the current data notification message was transmitted and returns. These times are used to calculate the shadow display time. In step 624, the routine sets an indication that the sharing system was denied permission to transmit data and returns.

Figure 7:
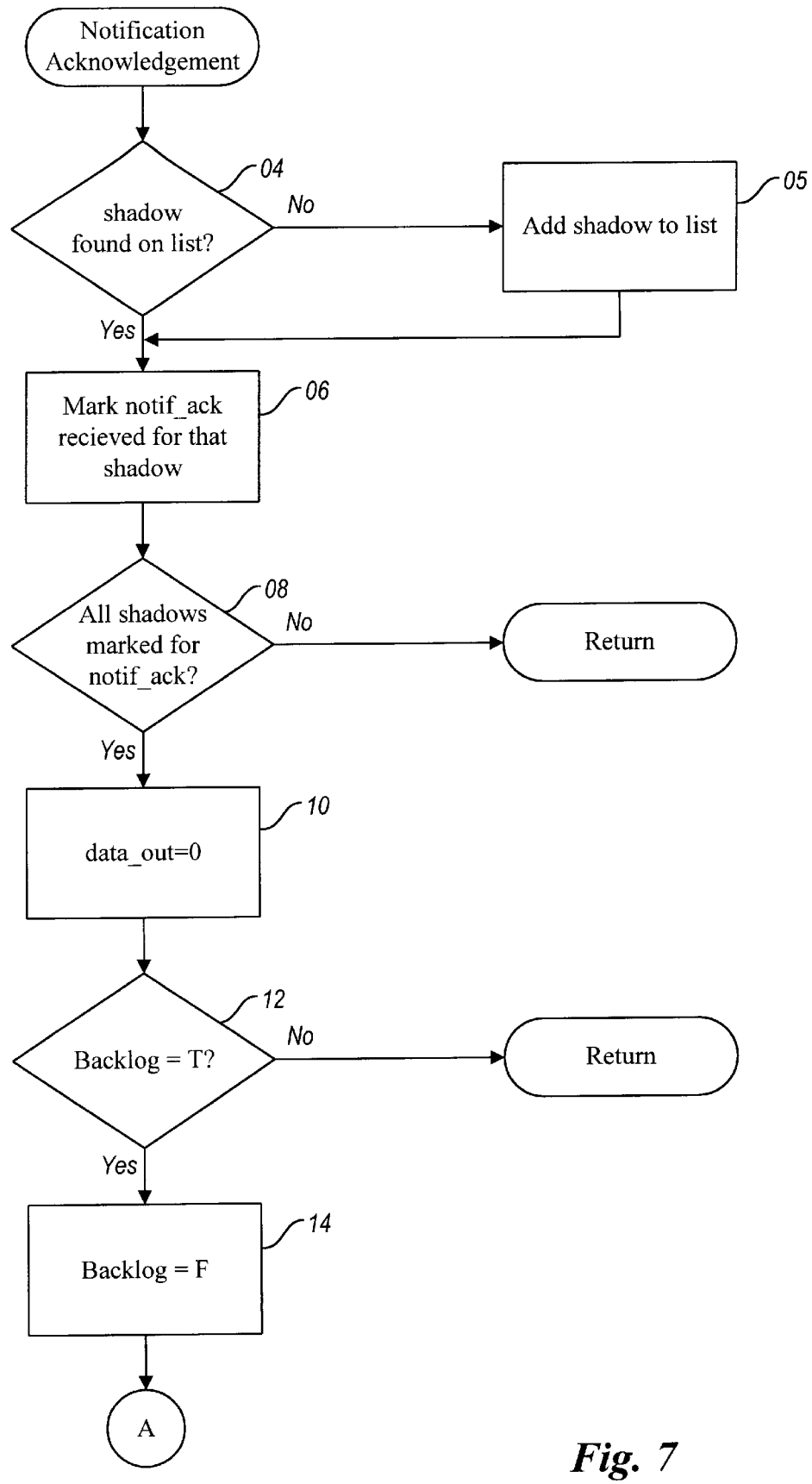
FIGS. 7–9 are a flow diagram of the notification acknowledgment routine.
Figure 8:
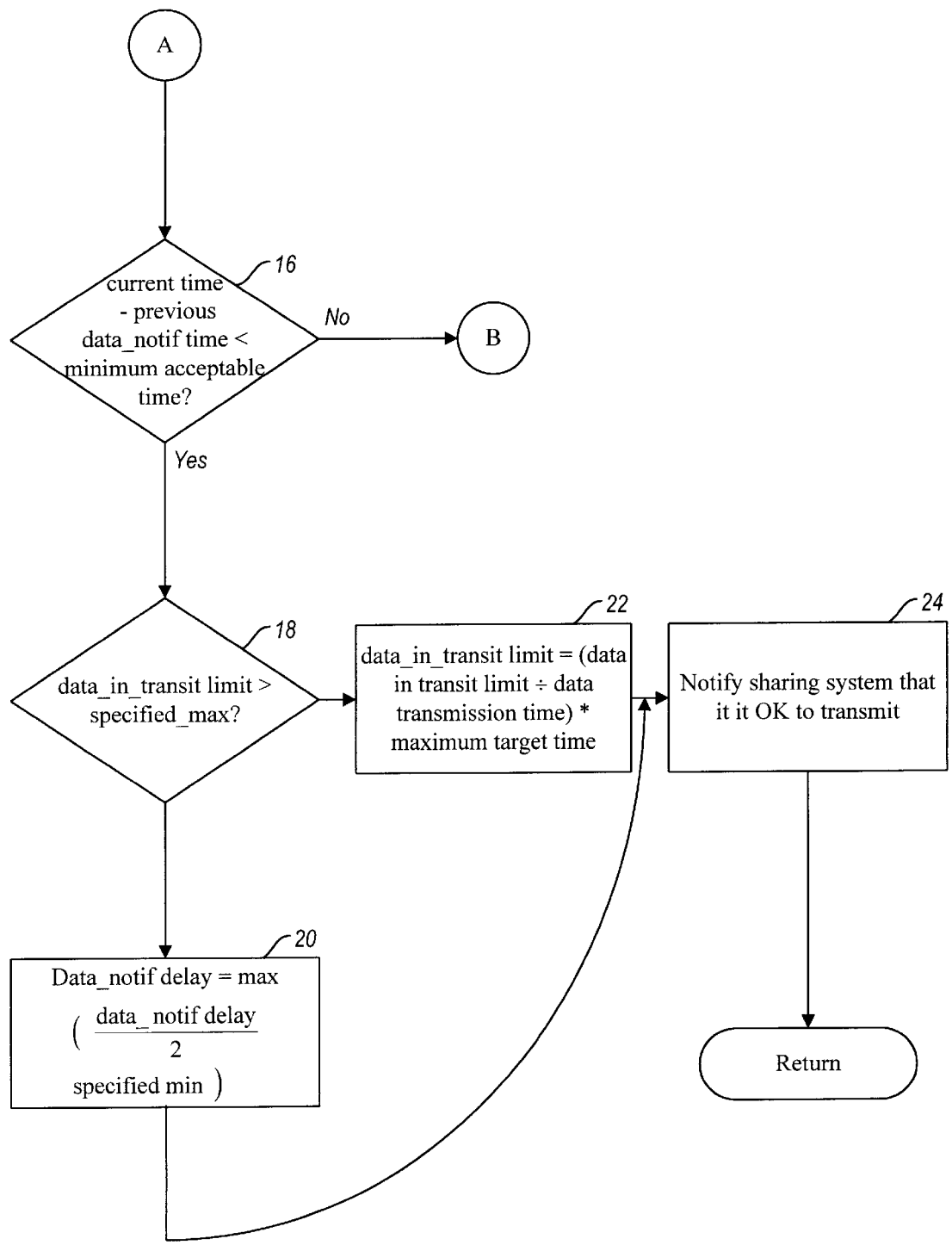
Figure 9:
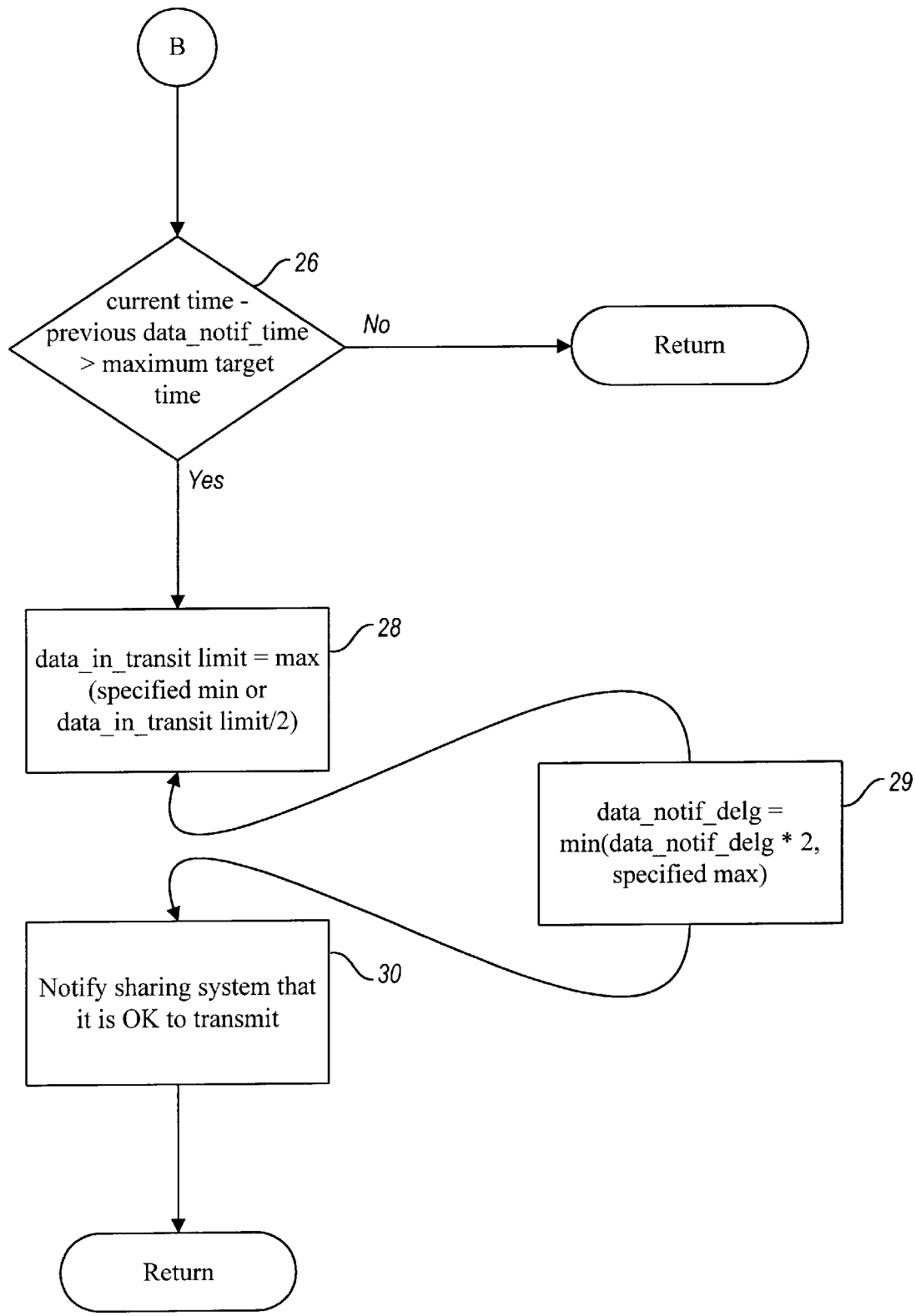

FIGS. 7–9 are a flow diagram of the notification acknowledgment routine. Initially, when a notification acknowledgment message is received, the host flow control system determines whether the shadow computer that transmitted the notification acknowledgment message is known. When the shadow computer is not known, the host flow control system adds that shadow computer to the list of shadow computers. Then, the host flow control system marks that a notification acknowledgment message was received from that shadow computer. Upon receiving a notification acknowledgment message from each shadow flow control system, the host flow control system indicates that no data is currently in transit, adjusts the current amount of data that can be in transit, and updates the data notification delay.

Referring to FIGS. 7–9, in step 704, if the shadow computer that transmitted the notification acknowledgment message is in the list, then the routine continues at step 706, otherwise it continues at step 705. In step 705, the routine adds the shadow computer to the list. In step 706, the routine marks the list to indicate that the notification acknowledgment message has been received for that shadow computer. In step 708, if all shadow computers have acknowledged, then the routine continues at step 710, otherwise it returns. In step 710, the routine resets the amount of data currently in transit to zero. In step 712, if the sharing system was denied permission to transmit data that has not yet been transmitted, then the routine continues at step 714, otherwise it returns. In step 714, the routine indicates that there is no longer any backlog. In step 716, if the shadow display time is smaller than the minimum acceptable time, then the routine continues at step 718, otherwise it continues at step 726. In step 718, if the current amount of data that can be in transit is greater than a maximum amount, the routine continues at step 720, otherwise the routine continues at step 722. The maximum amount that can be in transit is selected so that if a shadow computer with a slow connection starts sharing, it will not take too long for it to process the transmitted data messages and transmit its first notification acknowledgment message. If the maximum were set too high, then the host flow control system would receive the notification acknowledgment message too late to affect its transmission rate and the shadow computer system would have an unacceptable delay. In step 720, the routine sets the data notification delay to be the maximum of either half of the current data notification delay or to a specified minimum (e.g., .1 second). Thus, if the output data is being displayed at a rapid rate, then data notification messages can be sent more frequently without burdening the system. In step 722, the routine increases the current amount of data that can be in transit. In step 724, the routine notifies the sharing system that it can now transmit its backlogged data. In step 726, if the shadow display time is greater than the maximum acceptable time, the routine continues at step 728, otherwise it returns. In step 728, the routine sets the current amount of data that can be in transit to half its current amount. In step 729, the routine sets the data notification delay to be the minimum of either twice the current data notification delay or to a specified maximum (e.g., 1 second). In step 730, the routine notifies the host sharing system that it can now transmit its data that was backlogged and then returns.

Figure 10:
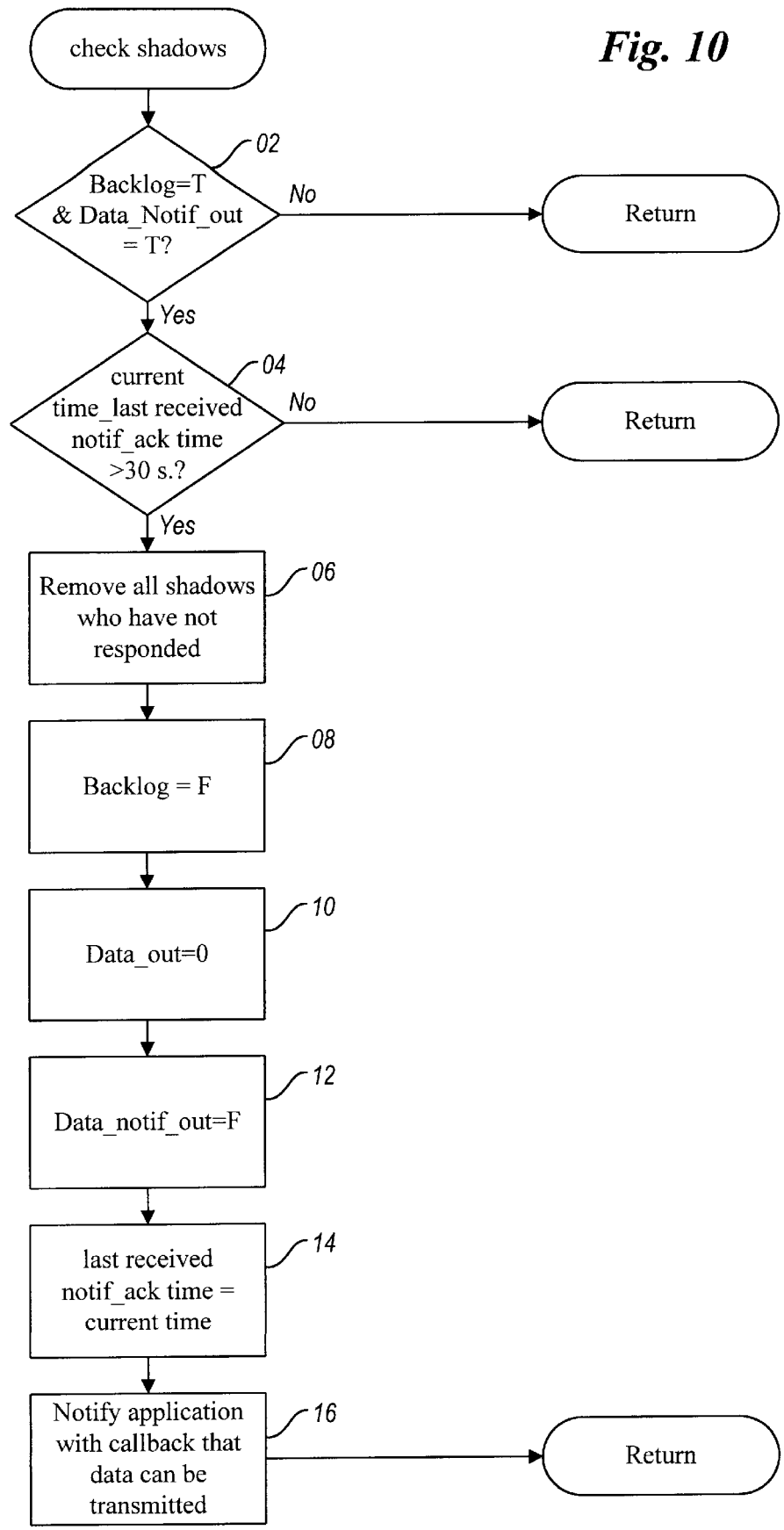
FIG. 10 is a flow diagram of the check shadows routine.

FIG. 10 illustrates an overview flow diagram of the check shadows routine. Periodically, the host flow control system checks its shadow computer list to determine whether a shadow computer system has stopped sharing the application program. Initially, when the sharing system has data that has not yet been transmitted and a data notification message has been transmitted but not yet acknowledged by all the shadow computers, the host flow control system determines whether the time since the data notification message was received exceeds a predetermined amount of time, such as 30 seconds. If so, the host flow control system assumes that any shadow computer who has not transmitted a notification acknowledgment message has stopped sharing the application program and removes it from the list. Then, the host flow control system notifies the sharing system that it can transmit data.

In step 1002, if the sharing system has backlogged data and not all the shadow computers have yet acknowledged the last data notification message, then the routine continues at step 1004, otherwise it returns. If the sharing system has no data in transit, then there is no need to mark any shadow computer as no longer sharing. Rather, the flow control system can wait until after the next data notification message is sent to make that determination. In step 1004, if the time since the last data notification message was transmitted is greater than 30 seconds, then the routine continues at step 1006, otherwise it returns. In step 1006, the routine removes from the list all shadow computers who have not acknowledged the last data notification message. In step 1008, the routine indicates that there is no backlog. In step 1010, the routine indicates that no data is currently in transit. In step 1012, the routine indicates that no data notification message is currently outstanding. In step 1014, the routine sets the time of the last received acknowledgment to the current time. In step 1016, the routine notifies the sharing system with a callback function that it can transmit the backlogged data and returns.

When a shadow sharing system receives a data notification message, it queues the messages until it has a chance to process the messages. When a data message is received, a shadow sharing system provides an indication to its shadow flow control system. When the shadow flow control system receives the indication, it may re-acknowledge a previous data notification message just to let the host flow control system know that it is still sharing the application program. When the shadow sharing system finishes processing a data message, it notifies the shadow flow control system. The shadow flow control system determines whether less than a predetermined number of data messages are in the queue. If so, the shadow flow control system transmits the notification acknowledgment message. This predetermined number can be adjusted so that the shadow sharing system can finish processing the queued data messages just as it receives new data messages.

Figure 11:
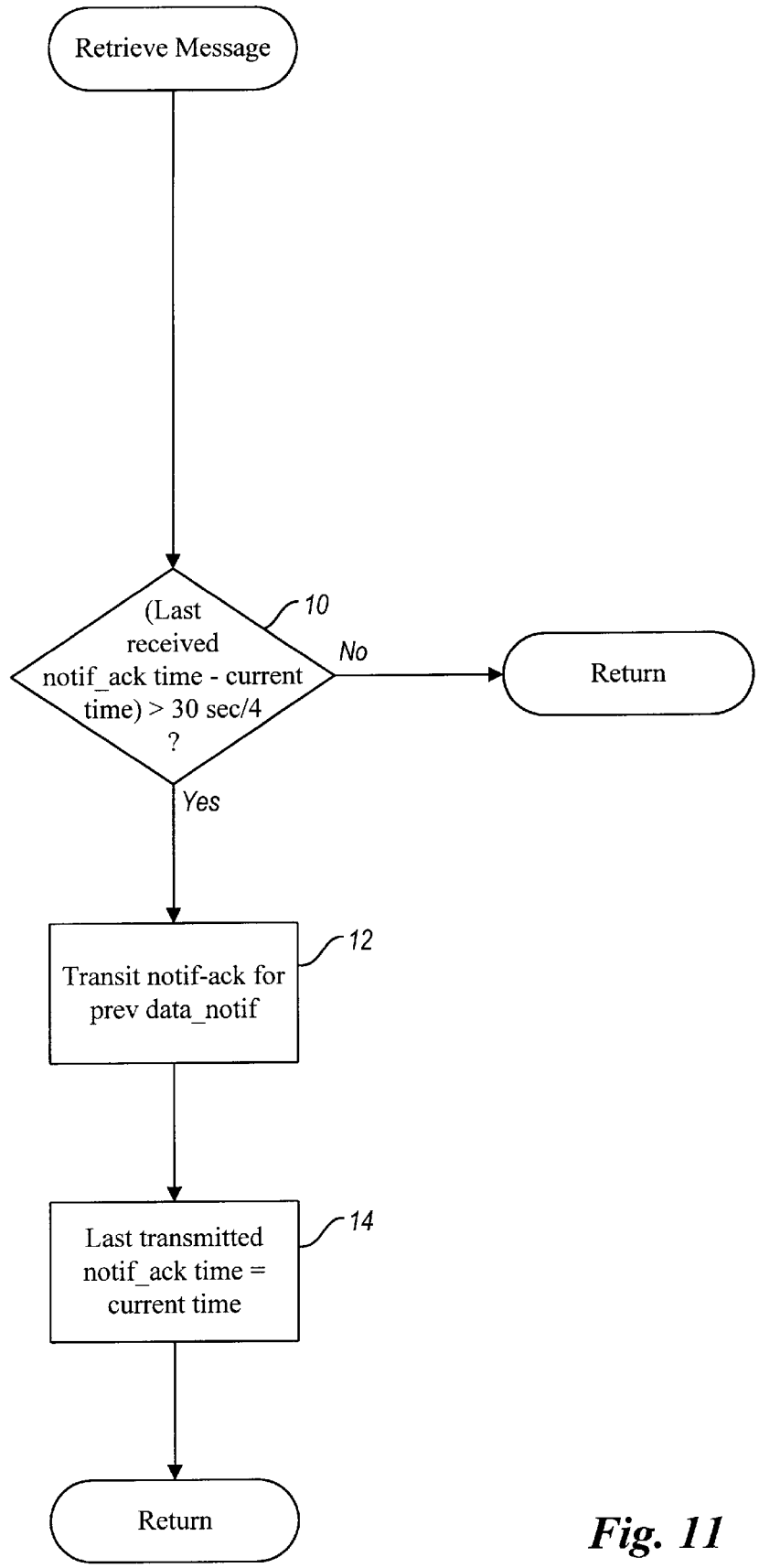
FIG. 11 is a flow diagram of the retrieve message routine.

FIG. 11 is a flow diagram of the retrieve message routine. In step is 1110, if the time since the last notification acknowledge message was received from any shadow computer is greater than a predetermined amount of time, such as 7.5 seconds, then the routine continues at step 1112, otherwise it returns. The time of 7.5 seconds represents one-fourth the time out (e.g., 30 seconds) used by the host flow control system. By sending a notification acknowledgment message frequently, the shadow flow control system can ensure that the shadow computer is not inadvertently removed from the shadow computer list of the host flow control system. In step 1112, the routine transmits a notification acknowledgment message for the last data notification message that was already acknowledged to indicate the shadow sharing system is still processing data messages. When the host flow control system receives such a re-acknowledgment, it restarts its time-out period for detecting that a shadow computer is no longer sharing the application. In step 1114, the routine records the time of this transmission and returns.

When a shadow sharing system has completed processing a data message, the shadow sharing system notifies the shadow flow control system. When the number of data messages currently in the queue is less than a predetermined amount, the shadow flow control system transmits a notification acknowledgment message to indicate to the host flow control system that the application program can receive and process additional data messages.

Figure 12:
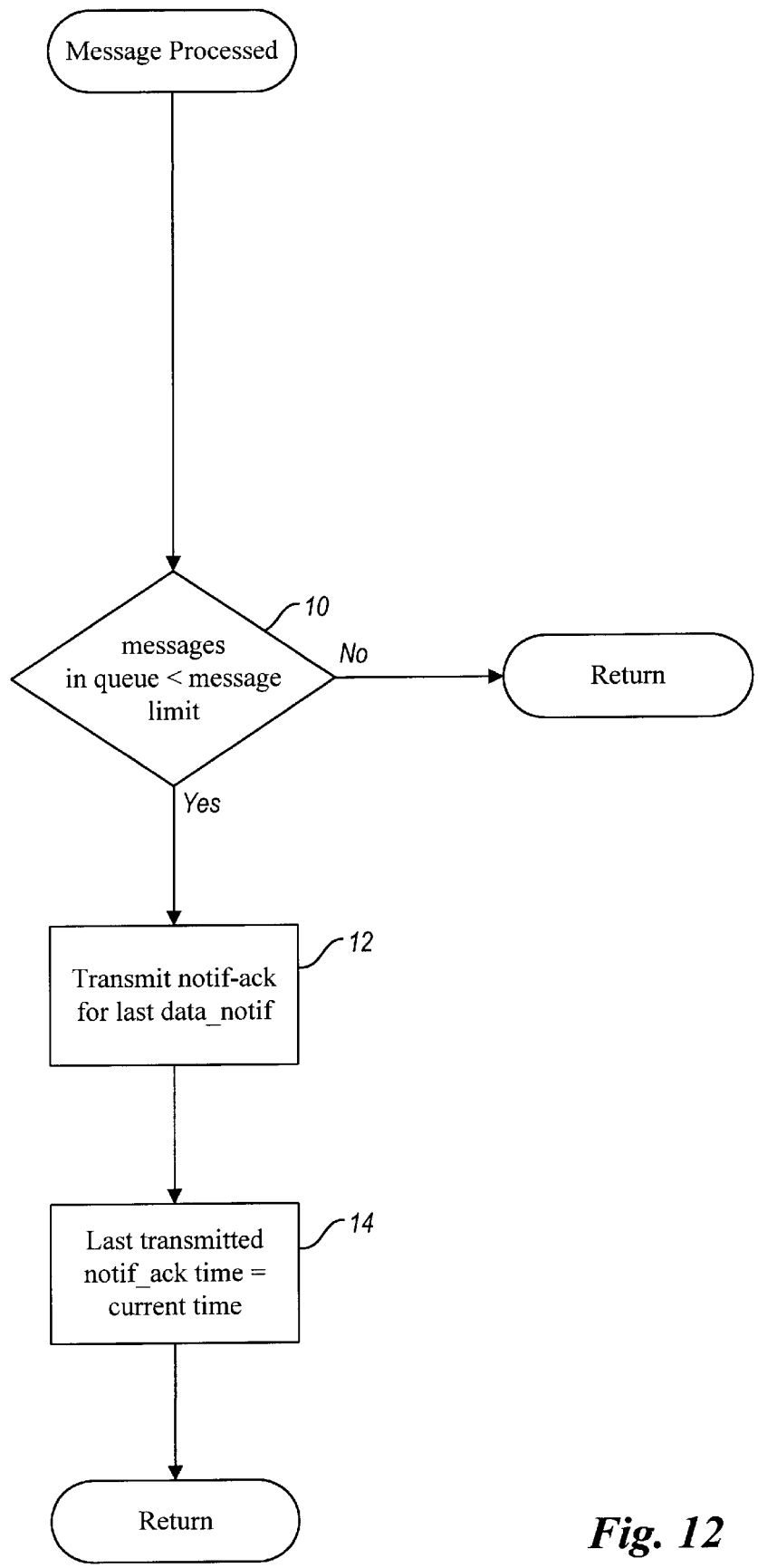
FIG. 12 is a flow diagram of the message processed routine.

FIG. 12 is a flow diagram of the message processed routine. In step 1210, if the number of data messages in the queue is less than the predetermined amount, then the routine continues at step 1212, otherwise the routine returns. In step 1212, the routine transmits a notification acknowledgment message for the last received data notification message to indicate the shadow sharing system can receive additional data messages. In step 1214, the routine resets the time of the last notification acknowledgment message and returns.

Although the present invention has been described in terms of one embodiment, it is not intended that the invention be limited by this embodiment. Modifications within the spirit of the present invention will be apparent to those skilled in the art. For example, although the present invention has been described relative to sharing application programs among multiple computers, it is also applicable to the transmission of data between computers that are not sharing application programs. Additionally, although the present invention has been discussed with regard to transmission of orders and screen data, it can also be used with other forms of data, such as audio data. Also, the flow control system can perform its processing for several applications that are concurrently being shared. The flow control systems in such a case would maintain separate state (e.g., data notification message count, shadow computer list) for each application being shared. The scope of the present invention is defined in the claims that follow.

We claim:

1. A method in a computer system for controlling flow of output data between computers sharing an application program, the application program being executed on a host computer and shared with shadow computers, each computer having a sharing system for coordinating the sharing of the application program, the method comprising:

under control of the sharing system of the host computer, requesting a flow control system of the host computer for permission to transmit the output data to all of the shadow computer; and under control of the flow control system of the host computer, upon receiving the request for permission, determining whether the amount of output data currently in transit from the host computer to all of the shadow computers exceeds an amount that can be in transit;

when the amount is not exceeded, granting permission to the sharing system of the host computer; and when the amount is exceeded, denying permission to the sharing system of the host computer; and periodically calculating a shadow display time that represents a time needed to allow for the transmitting of a certain amount of the output data to all of the shadow computers and to allow all of the shadow computers to process the certain amount of the output data; and using the shadow display time to determine the amount of the data that can be transmitted to all of the shadow computers within given time segments so that the host computer and all of the shadow computers can be displaying transmitted amounts of the output data at approximately the same time; and under control of the sharing system, when permission is granted, transmitting the output data to all of the shadow computers in the determined amount.

2. The method of claim 1 wherein the calculating of the shadow display time includes transmitting a data notification message to the flow control system of each shadow computer and wherein the flow control system of each shadow computer transmits a notification acknowledgment message to the flow control system of the host computer when the sharing system of the shadow computer is ready to receive more output data and the data notification message has not yet been acknowledged.

3. The method of claim 2 including:

under control of the flow control system of the host computer, when permission was previously denied and upon receiving a notification acknowledgment message from the flow control system of each shadow computer, notifying the sharing system of the host computer that the output data can now be transmitted.

4. The method of claim 1 wherein the amount of data that can be transmitted with the given time segments is decreased when the shadow display time is larger than acceptable and is increased when the shadow display time is smaller than acceptable.

5. A method for controlling flow of output data between computers sharing an application program, the application program being executed on a host computer and shared with shadow computers, the method comprising:

transmitting amounts of the output data from the host computer to all of the shadow computers within given time segments;

determining a shadow display time representing the time it takes for all of the shadow computers to receive and display transmitted amounts of the output data;

when the shadow display time is greater than an acceptable time, decreasing the amount of the output data that can be transmitted from the host computer to all of the shadow computers within the given time segment; and when the shadow time is less than the acceptable time, increasing the amount of the output data that can be transmitted from the host computer to all of the shadow computers within the given time segments.

6. The method of claim 5 wherein each computer has a sharing system for coordinating the sharing of the application program, the sharing system of the host computer having a flow control system that calculates the shadow display time and adjusts the amount of data that can be transmitted within the given time segments.

7. The method of claim 5 wherein each computer has a sharing system for coordinating the sharing of the application program, each sharing system having a flow control system, wherein a shadow sharing system of a shadow computer notifies a shadow control system of the shadow computer when output data has been displayed, and wherein upon being notified, the shadow flow control system notifies a host flow control system of the host computer so that the host flow control system can calculate the shadow display time.

8. A computer-readable medium containing instructions for causing a computer system to control flow of output data between computers sharing an application program, the application program being executed on a host computer and shared with shadow computers, the instructions performing the steps comprising:

determining a shadow display time representing a time it takes for all of the shadow computers to receive and display an amount of the output data transmitted to all of the shadow computers by the host computer;

when the shadow display time is not within a predetermined range, adjusting the amount of the output data that can be transmitted within a given time unit from the host computer to all of the shadow computers; and delaying transmission of the adjusted amount of the output data when the total amount of data to be transmitted between the host computer and all of the shadow computers would exceed a predetermined limit so that the shadow computers can be displaying the same output data as the host computer.

9. The computer-readable medium of claim 8 wherein each computer has a sharing system for coordinating the sharing of the application program, the sharing system of the host computer having a flow control system that calculates the shadow display time and that adjusts the amount of data that can be in transit.

10. The computer-readable medium of claim 8 wherein each computer has a sharing system for coordinating the sharing of the application program, each sharing system having a flow control system, wherein a shadow sharing system of a shadow computer notifies a shadow control system of the shadow computer when output data has been displayed, and wherein upon receiving the notification, the shadow flow control system notifies a host flow control system of the host computer so that the host flow control system can calculate the shadow display time.

11. A method for controlling flow of output data between computers sharing an application program, the application program being executed on a host computer and shared with shadow computers, the method comprising:

transmitting an amount of the output data from the host computer to all of the shadow computers within a given time segment;

determining a time representing the time it takes for all of the shadow computers to receive and display the transmitted output data; and when the determined time is not acceptable, adjusting the amount of the output data that can be transmitted from the host computer to all of the shadow computers within the given time segment.

\* \* \* \* \*

UNITED STATES PATENT AND TRADEMARK OFFICE
CERTIFICATE OF CORRECTION

PATENT NO. : 6,032,188
DATED : February 29, 2000
INVENTOR(S) : Christopher J. Mairs, et al.

It is certified that error appears in the above-identified patent and that said Letters Patent is hereby corrected as shown below:

In Column 2, line 12: "Compter, C" should read --Computer C"--.

In Column 6, line 31: "($\cong$16/3*8) should read --($\cong$16/3*8)--.

In Column 7, line 25: "many to different" should read --many different--.

In Column 8, line 63, "amount data" should read --amount of data--.

In Column 10, line 66: "in" should read --In--.

In Claim 1, Column 15, line 15: "computer" should read --computers--.

Signed and Sealed this

Third Day of April, 2001

Attest:

NICHOLAS P. GODICI

Attesting Officer

Acting Director of the United States Patent and Trademark Office